(12) United States Patent
Vanmoor

(10) Patent No.: US 6,725,644 B2
(45) Date of Patent: Apr. 27, 2004

(54) COMBINED INPUT AND OUTPUT SYSTEM FOR AN INTERNAL COMBUSTION ENGINE AND TURBINE POWER PLANT

(76) Inventor: Arthur Vanmoor, 22 SE. 4 St., Boca Raton, FL (US) 33432

( * ) Notice: Subject to any disclaimer, the term of this patent is extended or adjusted under 35 U.S.C. 154(b) by 0 days.

(21) Appl. No.: 10/075,537

(22) Filed: Feb. 14, 2002

(65) Prior Publication Data

US 2002/0092289 A1 Jul. 18, 2002

Related U.S. Application Data

(60) Continuation-in-part of application No. 09/780,302, filed on Feb. 9, 2001, now Pat. No. 6,530,365, which is a division of application No. 09/503,665, filed on Feb. 14, 2000, now Pat. No. 6,257,195.

(30) Foreign Application Priority Data

| May 18, 1999 | (NL) | ................................. 102083 |
| Aug. 27, 2001 | (NL) | ............................. 1018509 |
| Aug. 27, 2001 | (NL) | ............................. 1018883 |

(51) Int. Cl.[7] ............................................. F02C 3/055
(52) U.S. Cl. ..................................... 60/39.45; 123/204
(58) Field of Search ........................ 60/791, 802, 793, 60/39.45; 123/204; 415/122.1; 417/405, 406; 475/160

(56) References Cited

U.S. PATENT DOCUMENTS

| 1,332,427 A | | 3/1920 | Cooper |
| 1,856,011 A | * | 4/1932 | Woodward ................... 123/204 |
| 1,992,003 A | | 2/1935 | Cook |
| 2,245,163 A | | 6/1941 | Smith |
| 2,693,080 A | * | 11/1954 | Hutchinson ................... 60/791 |
| 2,773,348 A | | 12/1956 | Grieshaber et al. |
| 2,942,687 A | | 6/1960 | Kollander |
| 3,121,469 A | | 2/1964 | Schelf |
| 3,393,668 A | | 7/1968 | Milgram |
| 3,513,929 A | | 5/1970 | Kim |
| 3,626,694 A | * | 12/1971 | Holste ......................... 60/793 |
| 3,761,205 A | * | 9/1973 | Cronstedt ................. 415/122.1 |
| 3,775,971 A | | 12/1973 | Gadefelt |
| 3,848,482 A | * | 11/1974 | Shank ......................... 475/160 |
| 3,853,432 A | * | 12/1974 | Cronstedt ................. 415/122.1 |
| 4,074,522 A | * | 2/1978 | McDowell ................... 123/204 |
| 4,251,987 A | * | 2/1981 | Adamson ..................... 417/405 |
| 4,490,622 A | * | 12/1984 | Osborn ....................... 417/406 |
| 4,614,086 A | | 9/1986 | Koch |
| 5,083,435 A | | 1/1992 | Lin |
| 6,263,673 B1 | | 7/2001 | Schmidt et al. |

* cited by examiner

Primary Examiner—Michael Koczo

(57) ABSTRACT

The engine has an input system formed with a fluid displacement pump that enables substantially continuous pumping from a low-pressure side to a high-pressure side substantially without any backflow or backpressure pulsations. The output system, in one embodiment, is an output system having a turbine rotation about an axis that is substantially orthogonal to the pressure flow originating from the prime mover. The output system may include a first turbine which provides for the mechanical work output of the engine and a second turbine which feeds back to drive the input system. Any increase in the load to be driven by the first turbine translates into a proportional increase in the drive energy fed back to the input system. In an alternative embodiment, a differential may be used to distribute the output power to a load or back to the input compressor.

7 Claims, 8 Drawing Sheets

COMBINED INPUT AND OUTPUT SYSTEM FOR AN INTERNAL COMBUSTION ENGINE AND TURBINE POWER PLANT

CROSS-REFERENCE TO RELATED APPLICATION

This is a continuation-in-part of my application Ser. No. 09/780,302, filed Feb. 9, 2001, now U.S. Pat. No. 6,530,365; which was a division of my earlier application No. 09/503,665, filed Feb. 14, 2000, now U.S. Pat. No. 6,257,195. The entire contents of my earlier documents are herein incorporated by reference.

BACKGROUND OF THE INVENTION

FIELD OF THE INVENTION

The invention lies in the field of power plant specifically designed for mobile applications. More specifically, the invention relates to a combination of an output system of an internal combustion engine or a turbine engine and an input system for injecting fluid into the combustion process. The input system, specifically, includes a displacement pump, specifically for pumping air and water, and to the utilization of such a pump as a gas compression pump in the internal combustion engine and the turbine.

Fluid displacement pumps are subject to a variety of applications in engineering. For instance, such pumps are utilized in compression systems such as air compressors and as fluid pumps. For example, British Patent Specification 265,659 to Bernhard discloses an internal combustion engine with fuel pressurization separate from the combustion chamber. There, fuel is pressurized in a compressor and the pressurized fuel is fed from the pump to the engine through a port assembly.

U.S. Pat. No. 1,287,268 to Edwards discloses a propulsion system for a motor vehicle. There, a compressor formed with mutually interengaging helical impellers pumps to an internal combustion engine which is also formed with mutually interengaging helical impellers. The internal combustion engine drives a generator, which pumps hydraulic fluid to individual hydraulic motors that are disposed at each of the wheels. The impellers of Edwards are each formed with a frusto-conical axle. The helical blades correspondingly decrease in width along the increasing-diameter axle. The walls defining the housing around the impellers increase in diameter in the direction in which the axle diameter decreases. As a result, the helical combustion chamber increases in volume from inside the housing to the axial ends of the impellers.

Where such fluid displacement pumps are utilized in compression systems, it is important that the pump is directed from the low-pressure side to the high-pressure side. Continuous backflow and/or backpressure pulsations must be prevented so as to assure efficient operation of the attendant system. In an electrical equivalent diagram, the pump would in effect be modeled as a diode and power source.

SUMMARY OF THE INVENTION

It is an object of the invention to provide an output system of an internal combustion engine and turbine plant and a combination of the novel output system and an input system formed with a fluid displacement pump, which overcomes the disadvantages of the heretofore-known devices and methods of this general type and which is further improved in terms of efficiency and backflow prevention, and which allows essentially continuous output with power feedback that is automatically varied according to the load on the output system.

With the foregoing and other objects in view there is provided, in accordance with the invention, an engine, comprising:
- a rotary input system for compressing a combustion fluid and feeding the combustion fluid into a combustion chamber of the engine, whereby an increase and a decrease in an input speed of the input system respectively cause a corresponding increase and a decrease in a pressure output of combustion chamber;
- a first turbine connected to a pressure output of the combustion chamber and driving a load; and
- a second turbine connected to the pressure output of the combustion chamber and connected to drive the rotary input system;
- whereby an increase in the pressure output of the combustion chamber acting on the second turbine increases the input speed of the input system and increases the pressure output of the combustion chamber.

In accordance with an added feature of the invention, a mechanical or electrical feedback link connects the second turbine to the input system and drives the input system.

In an alternative embodiment of the invention, there is provided a single turbine connected to a pressure output of the combustion chamber;
- a differential connected to and driven by the turbine, the differential having a first output for driving a load and a second output linked to the input system and driving the input system.

With the above and other objects in view there is also provided, in accordance with the invention, a combined input and output system for an internal combustion engine, comprising:
- a rotary input system disposed to propel a fluid flow along a given input direction, the input system including an impeller having a rotary axis extending substantially parallel to the given input direction;
- an input conduit connecting the input system to a combustion chamber of the internal combustion engine;
- a rotary output system connected to a pressure output of the combustion chamber and being subjected to a pressurized gas flow from the combustion chamber flowing along a given output direction, the output system having a turbine driven by the pressurized gas flow and disposed to rotate about an axis substantially perpendicular to the given output direction.

In accordance with an added feature of the invention, the input system includes a fluid displacement pump having: a housing formed with a chamber having walls defined by two parallel, mutually intersecting cylindrical openings defining respective cylinder axes; and a double helix spindle impeller for pumping a fluid through the chamber, the double helix spindle impeller including two rotatable, substantially cylindrical axles each carrying a helically rising blade substantially sealing against the walls of the chamber and formed to pump fluid through the chamber upon being rotated.

In accordance with another feature of the invention, the blades of the double helix spindle impeller have a radius substantially equal to a spacing distance between the cylindrical axles. In accordance with an additional feature of the invention, the blades enclose an angle of between approximately 45° and almost 90° with the cylindrical axles.

In accordance with a further feature of the invention, the input conduit is a helically winding pipe. This feature is particularly suitable for assuring preheating of the injection gas.

In accordance with again an added feature of the invention, a feedback link connects the power output system to the input system and drives the input system.

In accordance with a concomitant feature of the invention, the output system includes two sets of turbines, a first set of turbines providing a power output of the internal combustion engine, and a second set of turbines being connected via a feedback link to the input system for driving the input system.

The displacement pump system disclosed here provides for a substantially continuous fluid flow, such as air flow into the combustion chamber with a minimum in pulsations. Any backpressure from the combustion chamber into the air intake is safely blocked off by the walls of the double-impeller system. At least one continuous wall, preferably two complete walls, are at all times established by the rotating impeller blades and the relative alignment of the impellers.

One of the important features is that the blades of the impeller system are almost flat, i.e., their attack angle relative to backpressure is close to perpendicular so that they will not be turned by a pressurized backflow. The impeller rotation that is introduced via the spindle shafts, however, leads to a volume displacement towards the chamber to be pressurized. The impeller system can be driven with variable speed, which translates proportionally in a variable fluid displacement and/or to a variable pressure buildup.

With the above and other objects in view there is also provided, in accordance with the invention, a combined input and output system for an internal combustion engine, comprising:

a rotary input system disposed to propel a combustion fluid into a combustion chamber of the internal combustion engine, whereby an increase and a decrease in an input speed of the input system respectively cause a corresponding increase and a decrease in a pressure output of the internal combustion engine;

a first output system connected to a pressure output of the combustion chamber and driving a load; and a second output system connected to the pressure output of the combustion chamber and driving the rotary input system;

whereby an increase in the load automatically causes a higher proportion of the pressure output of the combustion chamber to act on the second output system, to increase the input speed of the input system, and to increase the pressure output of the combustion chamber.

In accordance with again another feature of the invention, there is provided a mechanical feedback link connecting the power output system to the input system and driving the input system. In the alternative, there may be provided an electrical feedback link converting a power output of the power output system to electrical energy and for driving the input system.

Other features which are considered as characteristic for the invention are set forth in the appended claims.

Although the invention is illustrated and described herein as embodied in a power output system of a prime mover and a combination of an output system and an input system for with a fluid displacement pump with backflow stop, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
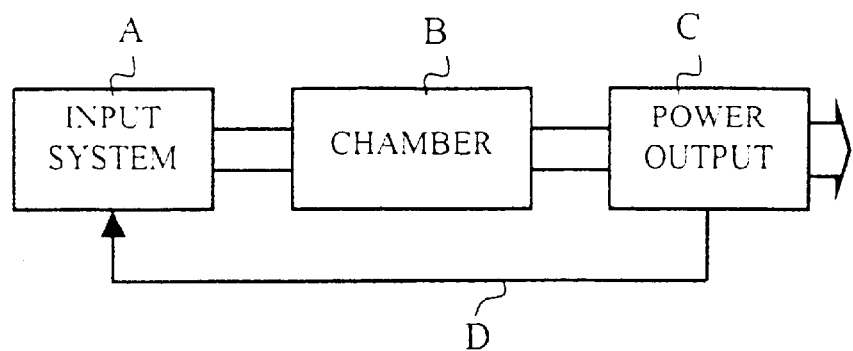
FIG. 1A is a schematic view of an internal combustion engine with three separate systems, namely an input system according to the invention, a combustion chamber, and an output system.
Figure 1B:
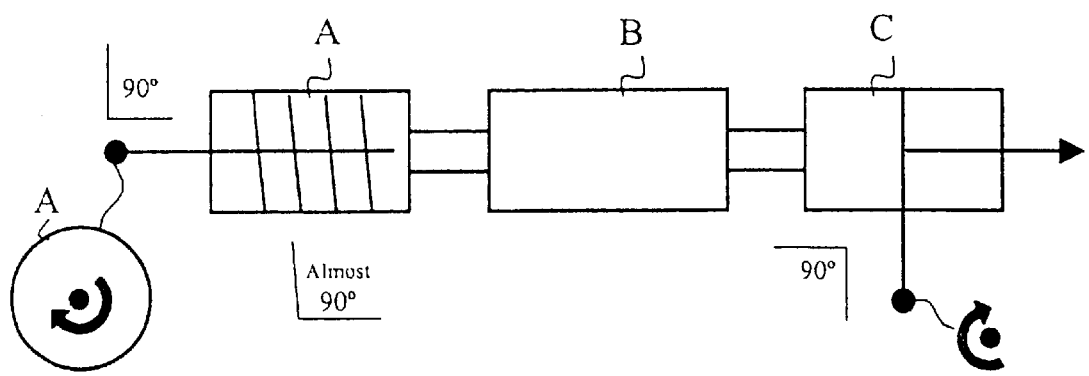
FIG. 1B is a slightly more schematic view of the internal combustion engine with the fluid displacement pump according to the invention.

Referring now to the figures of the drawing in detail and first, particularly, to FIGS. 1A and 1B thereof, there is seen an exemplary application of the pump according to the invention. The associated engine and the system as a whole is described in detail in my copending parent application Ser. No. 09/503,665, the disclosure of which is herein incorporated by reference. The system consists of three separate parts, namely the input system/air displacement system A, a combustion chamber B, and a power output system C. The power output system is also a displacement system with the power output perpendicular to the blades of the input system. The power output of the output system C is partially fed back to the input system so as to drive the continuous air-fuel injection. The feedback is effected by a mechanical link D with optionally variable pressure generation, i.e., variable compression.

It is important for the system of the invention that, while the input system A is open towards the combustion chamber B, the same is not true for the reverse. The impeller injection system which will be described below satisfies this requirement.

An important feature of the novel system is the disposition and alignment of the air (or air-fuel) injection system, namely a rotary system which will close off the air injection intake pipe substantially air-tightly and which will not be subject to backpressure resistances. The main output vector, as shown at the output system C is substantially perpendicular to the alignment of the air injection system. Accordingly, the power output, which is parallel to the output force vector in the mechanical system, must necessarily be virtually exclusively through the power output system.

Figure 2:
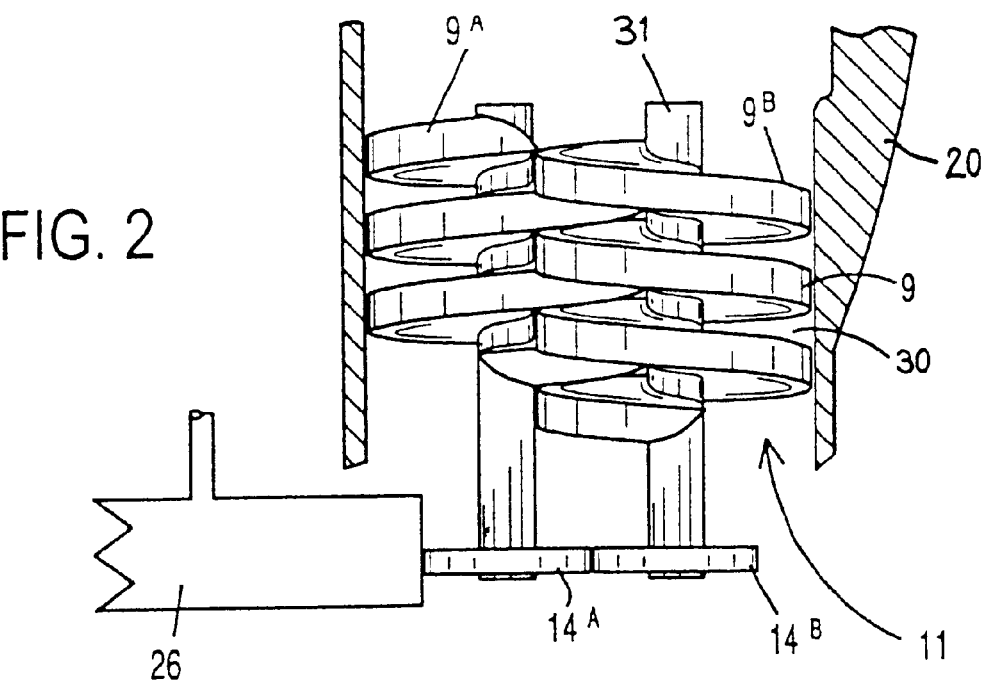
FIG. 2 is a partial view of a fluid displacement pump with a variable speed drive system.

Referring now to FIG. 2, there is shown a double impeller system, with a first impeller 9A driven by a first gear 14A and a second impeller 9B driven by a second gear 14B. The impeller embodiment is a positive displacement system and, at the same time, a back-pressure membrane. As the ribbed impellers rotate, the air flow 11 is "packaged" into chamber 30 formed between the impeller axle 31, the wall 20, and the blades 9B. The axle 31 is a substantially cylindrical axle, i.e., its walls all follow a parallel orientation. Advantageously, the cross-section of the axle 31 is circular, so that it defines a circular cylinder. Following the helical path of the chamber 30, it is closed off by the blade 9A of the adjacent impeller structure. Depending on the rotational speed of the impeller system and the size of the chambers 30, the impellers 9A and 9B form a pressure pump with positive displacement towards a high-pressure chamber. The air flow 11 is at a lesser pressure than in the high-pressure chamber. As the blades 9A and 9B of the impeller rotate, various vertically stacked chambers are opened and closed so that it will result in a positive flow from the bottom to the high-pressure side at the top. At the same time, any pulsations and explosions due, for example, to a combustion of fuel in a chamber on the high-pressure side will be prevented from flowing back past the blades 9A and 9B. In other words, the impeller pump is always closed with regard to a direct backflow of the fluid out from the high-pressure side.

The impellers 9A and 9B may be driven at variable speed. For example, a toothed rack may be provided or a clutch system to drive the gear 26. Any type of speed control may be implemented for the impeller system. It is also possible, of course, the drive the shafts 31 directly with direct drive motors. The two spindles are engaged with the meshing gear wheels 14A and 14B. A further embodiment of the variable drive system, which adjusts the drive speed of the impellers, and thus the pressure output, automatically in dependence on the load will be described in the following text.

Figure 3:
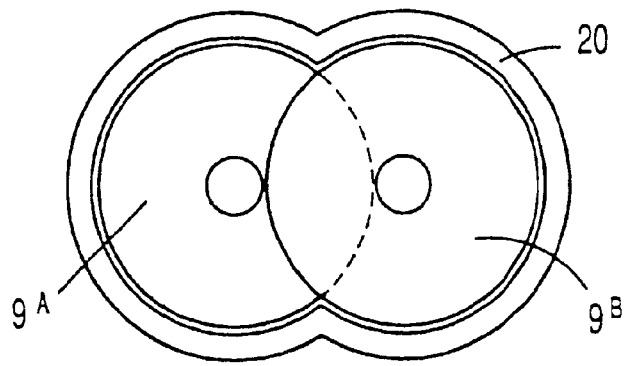
FIG. 3 is a top plan view onto the impeller blades and the housing of FIG. 2.

FIG. 3 is an axial plan view of the impeller system showing the engagement or meshing of the two blades 9A and 9B and the tight placement of the impeller blades inside the walls 20. The positive displacement force of the impeller system is thus only slightly impaired by backflow and leakage between the impeller blades 9A, 9B and the walls 20 and, negligibly, between the axle 31 and the adjacent blade 9A or 9B.

Figure 4:
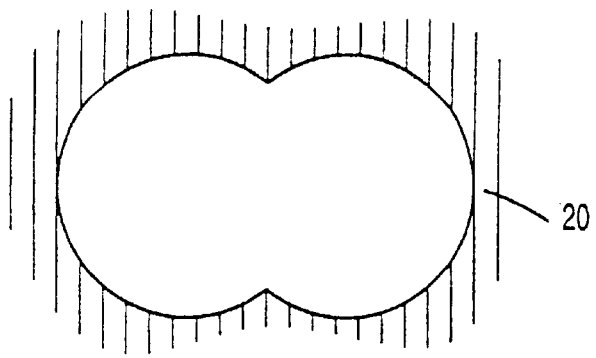
FIG. 4 is a plan view of the housing.

With reference to FIGS. 3 and 4, the housing of the positive displacement system is defined by walls 20 with rotationally symmetrical portions. In the illustrated embodiment with the two interengaging impellers, the housing has two intersecting circular arches that essentially correspond to the periphery of the blades 9A and 9B in their engagement position. A width D of the housing opening in which the impeller spindles are rotatably disposed corresponds to a diameter of the impeller blades 9A, 9B minus the overlap O. The overlap O, in turn, corresponds essentially to the rifling depth of the impellers, i.e., the difference in the radius of the blades 9A, 9B and the radius of the shaft 31. The width D may also be expressed as the sum of two times the diameter d of the shaft 31 plus two times the rifling depth of the impellers.

Figure 5:
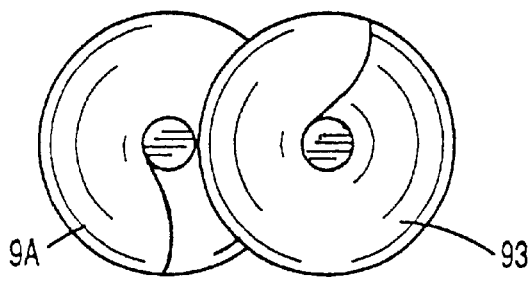
FIG. 5 is a plan view onto the impeller blades.
Figure 6:
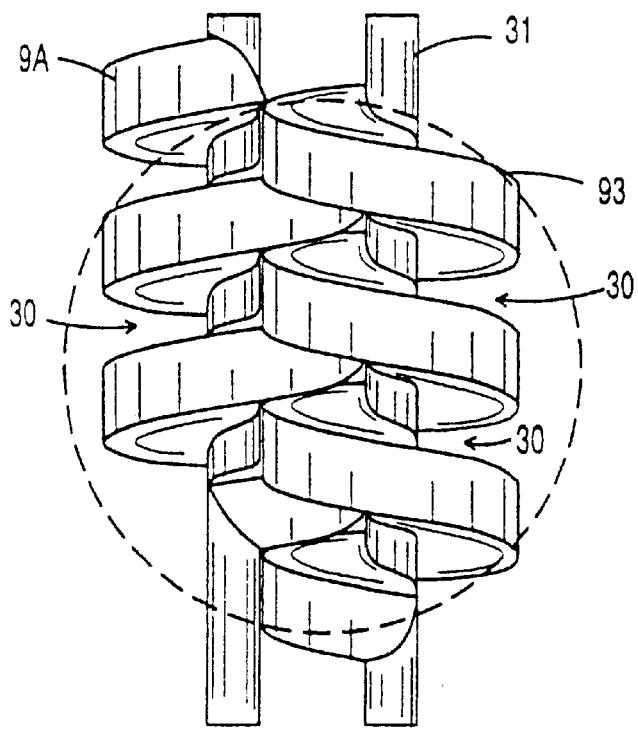
FIG. 6 is a side view of two mutually interengaging blade structures.

As seen in FIGS. 5 and 6, the blades or helical rifling of the blades is offset by approximately 180° so as to distribute the pumping discharge of each of the chambers 30 into the pressure outlet. In other words, it is advantageous for the chambers 30 to reach the top position at which they empty into the combustion chamber alternatingly. In the case of two blades, the offset should thereby be in the neighborhood of 180°.

If three or more impeller spindles are used, the housing 20 requires a corresponding modification and, advantageously, the rotary offset of the impeller rifling may be distributed accordingly by 360°/n, where n is the number of impeller spindles.

Figure 7:
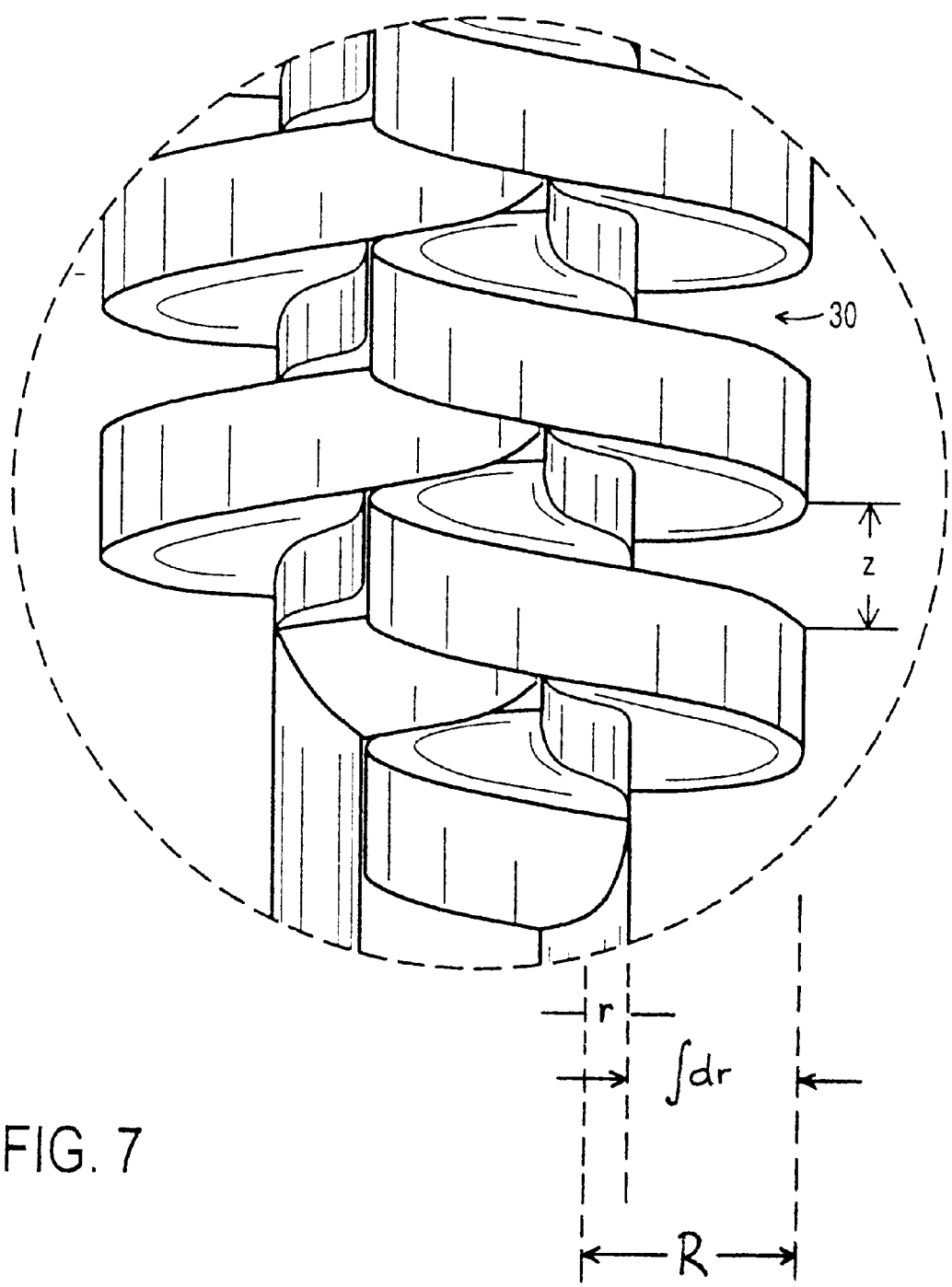
FIG. 7 is an enlarged view of the detail indicated in FIG. 6.

The volume of the chambers 30 and the rotational speed of the impellers defines the pump pressure and the volume displacement per time of the impeller injection. With reference to FIG. 7, the volume of each chamber 30 corresponds approximately to the double integral of the differential rotary angle dθ taken through 360° and the differential radius dr taken from the radius r of the shaft 30 to the radius R of the impeller blade 9A, 9B, multiplied with the blade spacing z, minus the volume portion of the adjacent blade that engages into the space in the center between the two spindles.

Figure 8:
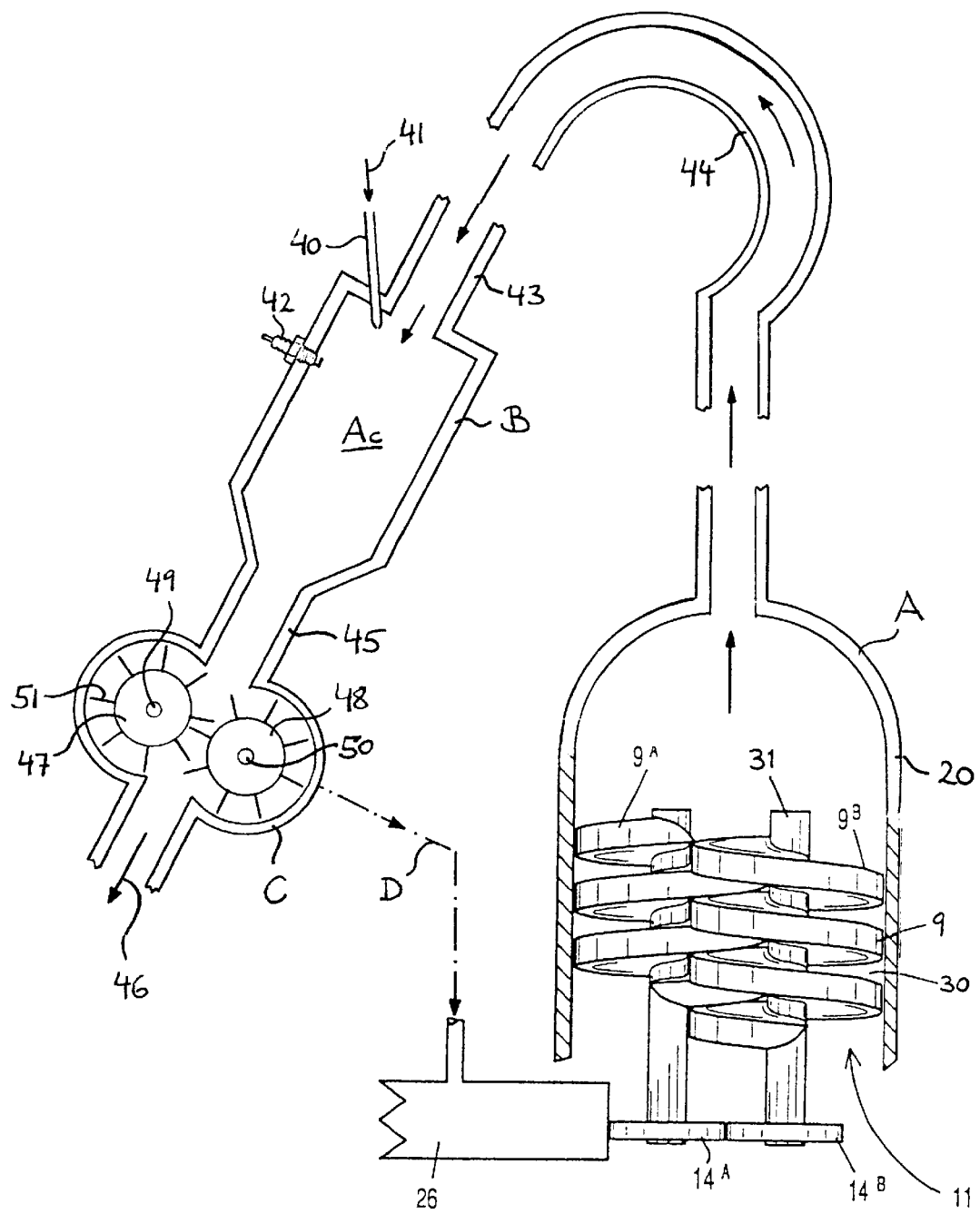
FIG. 8 is a diagrammatic illustration of a specific embodiment of the combination of the input system, the combustion system, the power output system, and a feedback to the input system.

Referring now to FIG. 8, there is shown the system of FIGS. 1A and 1B in a slightly less diagrammatic illustration. The input system A is formed by the double-impeller displacement pump described above with reference to FIGS. 2–7. The combustion system B is illustrated with a combustion chamber $A_C$, a fuel injector 40 at which combustible fuel 41 is injected into the chamber $A_C$, and an ignition device represented by a spark plug 42. The injector 40 may inject directly into the chamber AC or it may inject into an intake pipe 43.

The internal combustion system is not the subject of this description and its description is, therefore, only schematic and diagrammatic. Its placement within the system, however, is a feature of the novel power system. The combustion chamber is disposed in the vicinity of the input system, specifically in the vicinity of a conduit 44 connecting the impeller pump housing 20 to the combustion chamber $A_C$. The purpose of this placement is to ensure that the reaction heat from the combustion is utilized to preheat the injection air. In an advantageous embodiment, the placement is such that the compressed air exiting the housing 20 is primarily heated. This provides for additional compression and/or acceleration of the injection air (according to the ideal gas law PV=nRT).

Figure 9:
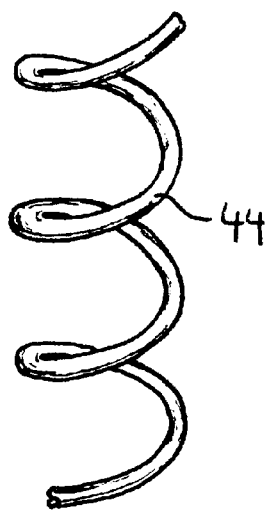
FIG. 9 is a perspective view of an alternative embodiment of a feed conduit.
Figure 10:
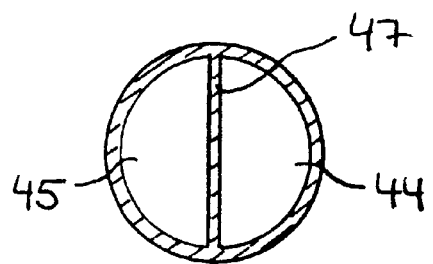
FIG. 10 is a transverse section through a combined input and exhaust duct, with direct heat transfer.

In order to assure proper heat exchange into the conduit 44, the same may be configured and or placed in a variety of ways. For example, a simple rounded elbow as shown in FIG. 8 may be considered sufficient. In the alternative, the conduit 44 may be coiled, as illustrated in FIG. 9. In the latter case, it may be possible to encase the combustion chamber or a hot pipe 45 or 46 of the exhaust system within the coiled conduit 44. Such configuration choices are best left to the engine design engineer, and the exemplary dispositions are provided for illustrative purposes only. As a further alternative, as illustrated in FIG. 10, the intake conduit 44 and the exhaust conduit 45 may share a common pipe for direct heat exchange via a membrane wall 47.

Following the exhaust pipe 45 issuing from the combustion chamber $A_C$, there is illustrated an output system C that includes a double turbine with two bucket wheels 47 and 48. The bucket wheels 47, 48 rotate about output shafts 49, 50, respectively, and they are provided with blades 51. While the blades 51 of the wheels 47 and 48 are drawn to openly mesh, they are in fact sealed against one another in a realistic implementation of the invention. That is, the blades 51 are provided with a shape and orientation as to form a proper seal in the exhaust/output pipe. The blades 51 or buckets may be in any configuration that is known from the prior art, so as to assure maximized power conversion from the mass flow out of the combustion chamber Ac into the power output shafts 49, 50. As indicated by the dash-dotted line D, the output of the shafts may be fed back to drive the input impellers via the gear 26. Primarily, however, the output of the turbines 47 and 48 forms the main power output of the system.

Figure 11:
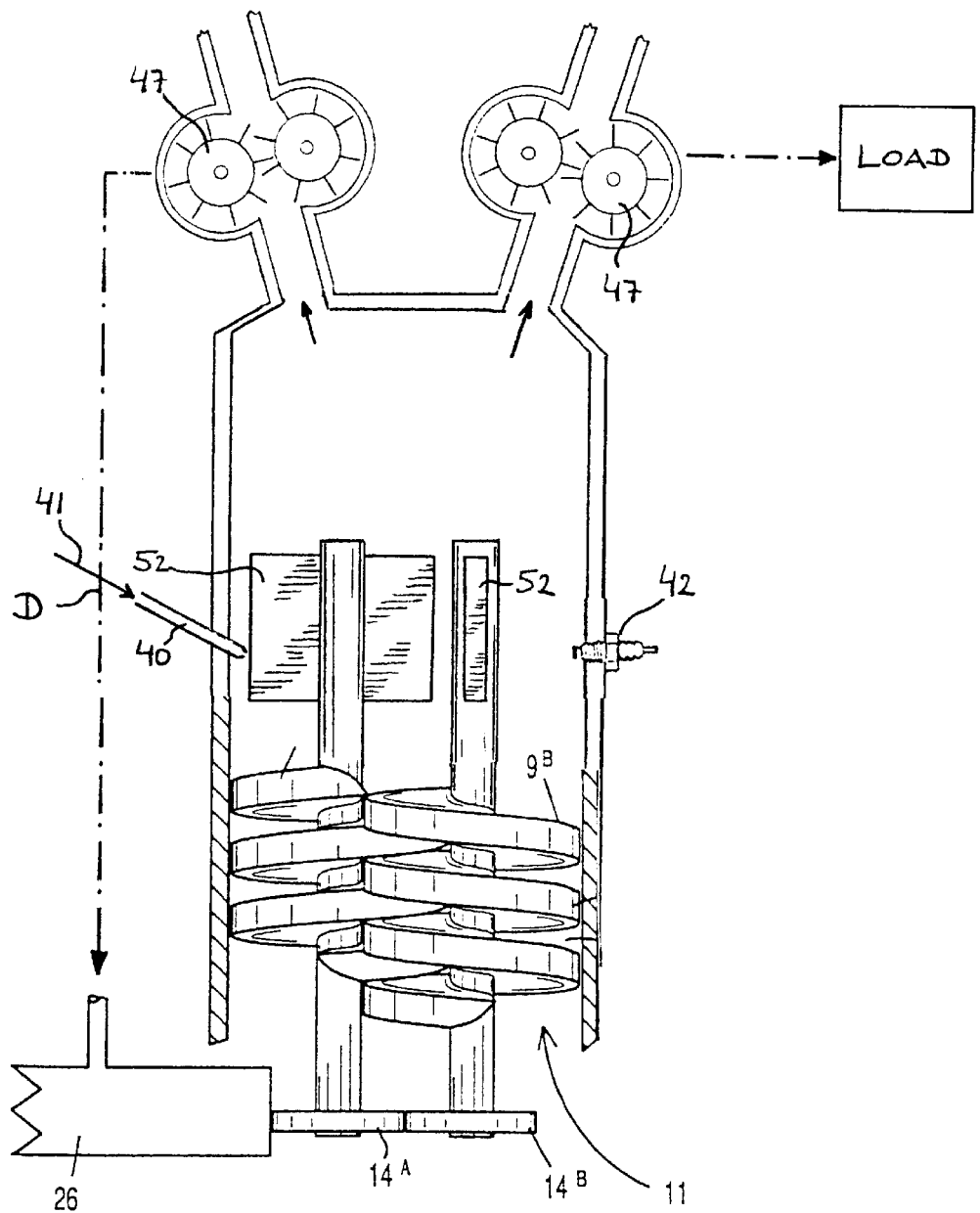
FIG. 11 is a diagrammatic illustration of an alternative embodiment of the combination of the input system, the combustion system, the power output system, and a variable feedback to the input system the feedback intensity of which depends on the load acting on the power output system.

A further system variation of the inventive concept is illustrated in FIG. 11. Here, the input system A and the combustion chamber B share a common housing. In addition, the impeller axles 31 each carry a mixing paddle 52 which cause the injected fuel 41 to be mixed with the injected air so as to assure complete combustion. The spark plug 42 represents the igniter which causes the mixture in the combustion chamber $A_C$ to be ignited. The feature that is of particular interest in FIG. 11 is the variable output/feedback system. The output of the right-hand output turbine is coupled to a load. Such a load may be the drive system of a motor vehicle and/or it may be a drive for an auxiliary system. The left-hand turbine is coupled back to the gear 26 that drives the input impellers. As the load increases, the resistance on its drive turbine increases. As a consequence, a greater proportion of the available power from the combustion pressure inside the chamber $A_C$ is transferred via the left-and turbine to the feedback system D. This means that the input impellers are driven at a higher rate, which in turn causes the output power to increase. In other words, a greater load on the output system automatically leads to greater output by way of the double-turbine output system illustrated in FIG. 11. That is, as a result of increasing the load, the impellers are sped up to rotate faster.

In effect, this feature may be referred to as a differential and variable feedback system and it solves a further problem typically associated with turbine drives. Namely, the typical lag in the acceleration of a turbine drive is substantially shortened by the automatic redirection of the output and input power as described.

By way of a simple example, say the system is used to propel a motor vehicle. As the vehicle is driven onto an incline, i.e., up a hill, the added resistance on the output immediately translates to a redirection of the power being released from the combustion chamber to the feedback system. This, in turn, immediately causes a greater feedback through the feedback system and thus a greater power output as the injection system is sped up.

While the description herein primarily contains a mechanical linkage forming the feedback link, it should be understood that the feedback may also be an electrical feedback system with a corresponding dynamo conversion from the mechanical output of the turbine into electrical energy and a conversion back to mechanical work for driving the impeller axles 31. This may be effected, for example, with direct-drive electrical motors driving the impeller axles 31 or with an electrical drive motor for driving the gear 26.

Figure 12:
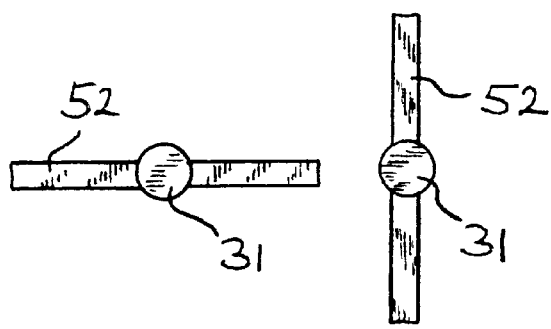
FIG. 12 is a plan view onto two impeller axles provided with mixing paddles.

FIG. 12 illustrates the mixing paddles 52 seen from above. It will be understood that these straight paddles 52 are only exemplary. Any variation of their shape and number is left to those of skill in the pertinent art.

Figure 13:
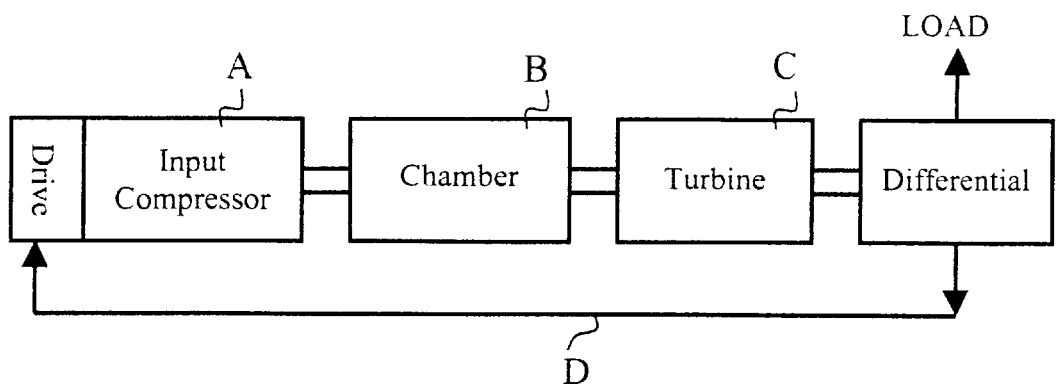
FIG. 13 is a diagrammatic view of a novel system with a turbine output and a differential for dividing the output energy to the load and to the feedback system.
Figure 14:
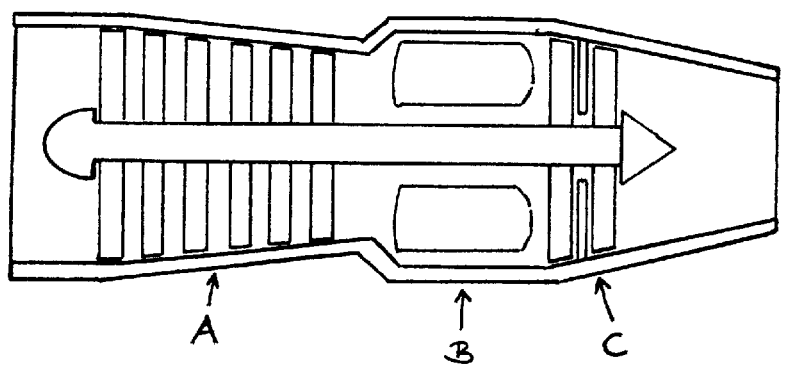
FIG. 14 is a diagrammatic side view of a prior art turbine power plant.

The turbine system illustrated in FIG. 13 utilizes a single turbine output system C. A power output shaft links into a differential with which the output power is distributed to a load and to a feedback system. It will be understood that any type of differential may be employed. The differential may be a mechanical or hydraulic differential, an electrical differential, or any combination. With reference to FIG. 14, which illustrates a prior art turbine power plant, it is clear that the primary reason why such a turbine cannot be utilized in motor vehicle applications is the time lag between a request for acceleration and the actual accelerated output. In the prior art turbine engine, the input compressor A is driven directly by the turbine C.

Figure 15:
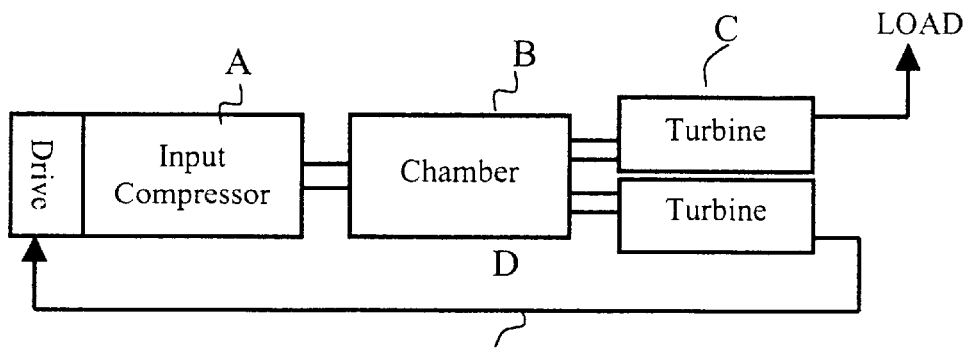
FIG. 15 is a diagrammatic view of my novel system with two turbine outputs, one for driving a load and one for driving the input compressor via a feedback link.

According to the novel system illustrated in FIGS. 13 and 15, the input compressor A is mechanically decoupled from the turbine C. The input compressor A, here, is formed by the impeller system illustrated in FIGS. 2–8 and is driven via the feedback linkage from the differential (FIG. 13) or the feedback turbine (FIG. 15). In contrast with the power division described with reference to FIG. 11, the feedback power in FIGS. 13 and 15 can be controlled. In FIG. 15, for example, the control is easily achieved with a valving system that allows the output pressure from the combustion chamber B to the feedback turbine C to be controlled or regulated. That is, the power for driving the load and the power for driving the input compressor via the feedback link can be easily adjusted by adjusting the pressurized gas flow from the chamber B to either turbine C. The power generated in the chamber, on the other hand, is adjusted by the driving of the input compressor A and the fuel injection into the chamber B.

I claim:

1. A combined input and output system for a combustion engine, comprising:
    a rotary input system disposed to propel a fluid flow along a given input direction, said input system including an impeller having a rotary axis extending substantially parallel to the given input direction;
    an input conduit connecting said input system to a combustion chamber of the combustion engine and an output conduit conducting a pressurized gas flow from the combustion chanter along a given output direction, said output conduit having a longitudinal axis along which the pressurized gas flow is conducted;
    a rotary output system connected in said output conduit and subjected to the pressurized gas flow from the combustion chamber along the given output direction, said output system having a turbine driven by the pressurized gas flow and disposed to rotate about an axis different from said rotary axis of said impeller and substantially perpendicular to said longitudinal axis of said output conduit.

2. The combination according to claim 1, wherein said input system includes a fluid displacement pump having:
    a housing formed with a chamber having walls defined by two parallel, mutually intersecting cylindrical openings defining respective cylinder axes; and
    at least two mutually interengaging impellers for pumping a fluid through said chamber, said impellers each including one rotatable, substantially cylindrical axle carrying a helically rising blade substantially sealing against said walls of said chamber and formed to pump fluid through said chamber upon being rotated.

3. The combination according to claim 2, wherein said helically rising blade of each of said impellers has a radius substantially equal to a spacing distance between said cylindrical axles of said impellers.

4. The combination according to claim 2, wherein said blade encloses an angle of between approximately 45° and almost 90° with said cylindrical axle.

5. The combination according to claim 1, wherein said input conduit is a helically winding pipe.

6. The combination according to claim 1, which comprises a feedback link connecting said power output system to said input system and driving said input system.

7. The combination according to claim 1, wherein said output system includes two sets of turbines, a first set of turbines providing a power output of the combustion engine, and a second set of turbines being connected via a feedback link to said input system for driving said input system.

* * * * *

UNITED STATES PATENT AND TRADEMARK OFFICE
CERTIFICATE OF CORRECTION

PATENT NO. : 6,725,644 B2
DATED : April 27, 2004
INVENTOR(S) : Arthur Vanmoor

It is certified that error appears in the above-identified patent and that said Letters Patent is hereby corrected as shown below:

Title page,
Item [30], should read as follows:

-- May 18, 1999 (NL) …………..102083
   Jul. 10, 2001 (NL) ………….1018509
   Aug. 27, 2001 (NL) ………….1018883 --

Signed and Sealed this

Twenty-ninth Day of June, 2004

JON W. DUDAS
*Acting Director of the United States Patent and Trademark Office*